United States Patent
Coughlan et al.

(10) Patent No.: US 8,229,145 B2
(45) Date of Patent: Jul. 24, 2012

(54) METHOD AND APPARATUS FOR CONFIGURING A HANDHELD AUDIO DEVICE USING EAR BIOMETRICS

(75) Inventors: Marc William Joseph Coughlan, Balmain (AU); Alexander Quentin Forbes, Westleigh (AU); Ciaran Gannon, Killara (AU); Paul Roller Michaelis, Louisville, CO (US); Peter Donald Runcie, Bilgola Plateau (AU); Ralph Warta, Gladesville (AU)

(73) Assignee: Avaya Inc., Basking Ridge, NJ (US)

( * ) Notice: Subject to any disclaimer, the term of this patent is extended or adjusted under 35 U.S.C. 154(b) by 1261 days.

(21) Appl. No.: 11/899,329

(22) Filed: Sep. 5, 2007

(65) Prior Publication Data

US 2009/0060240 A1  Mar. 5, 2009

(51) Int. Cl.
*H04R 25/00* (2006.01)
(52) U.S. Cl. .......................... 381/314; 381/312; 381/315
(58) Field of Classification Search .................. 381/314, 381/315, 56, 57, 60; 379/52; 600/559
See application file for complete search history.

(56) References Cited

U.S. PATENT DOCUMENTS

| | | | | |
|---|---|---|---|---|
| 4,454,609 A * | 6/1984 | Kates | ............................. | 381/320 |
| 5,787,187 A | 7/1998 | Bouchard et al. | | |
| 5,792,072 A | 8/1998 | Keefe | | |
| 5,868,682 A | 2/1999 | Combs | | |
| 5,919,143 A | 7/1999 | Jenkins | | |
| 6,549,792 B1 | 4/2003 | Cannon | | |
| 6,837,857 B2 | 1/2005 | Stirnemann | | |
| 7,065,232 B2 | 6/2006 | Geng | | |
| 7,181,192 B2 | 2/2007 | Panasik | | |
| 2004/0176702 A1 | 9/2004 | Stirnemann | | |
| 2004/0215968 A1 * | 10/2004 | Rodwell et al. | ................ | 713/186 |
| 2004/0258261 A1 * | 12/2004 | Cochran et al. | ................ | 381/315 |
| 2006/0128442 A1 | 6/2006 | Cho | | |
| 2006/0140453 A1 | 6/2006 | Geng | | |
| 2007/0027945 A1 | 2/2007 | McGrath | | |
| 2008/0148030 A1 * | 6/2008 | Goffin | ................................ | 713/1 |
| 2008/0285813 A1 * | 11/2008 | Holm | ............................ | 382/115 |

FOREIGN PATENT DOCUMENTS

| | | |
|---|---|---|
| EP | 1670221 A1 | 6/2006 |
| JP | 8116352 A | 5/1996 |
| JP | 200337651 A | 2/2003 |
| JP | 2006203683 A | 8/2006 |
| JP | 2007235474 A | 9/2007 |
| WO | 2007052186 A2 | 5/2007 |

OTHER PUBLICATIONS

Ping Yan, Bowyer, Kevin W., Empirical Evaluation of Advanced Ear Biometrics, Computer Vision and Pattern Recognition, 2005 IEEE Computer Society Conference on Computer Vision, Publication Date: Jun. 20-26, 2005, vol. 3, on pp. 41-41.

* cited by examiner

*Primary Examiner* — Kenneth Parker
*Assistant Examiner* — John Lin
(74) *Attorney, Agent, or Firm* — John C. Moran (57) ABSTRACT

A method and apparatus configure a handheld audio device to communicate audio information by identifying an ear being used with the handheld audio device and by configuring the handheld audio device in response to the ear identification to communicate audio information to the ear. The identification may use sonic or visual techniques to identify the ear.

16 Claims, 8 Drawing Sheets

METHOD AND APPARATUS FOR CONFIGURING A HANDHELD AUDIO DEVICE USING EAR BIOMETRICS

TECHNICAL FIELD

This invention relates to the configuration of a telephone, and in particular, to the use of ear biometrics to determine the configuration of the handheld audio device.

BACKGROUND OF THE INVENTION

Within the prior art, it is well known that certain individuals have hearing impairments in one or both ears. Such hearing impairments may relate to the volume of the audio information or/and spectral deficiencies. The solution in the prior art is to allow manual adjustment of a telephone to compensate for these hearing impairments. The solution suffers from a number of problems. First, if an individual has a hearing impairment in one ear but not the other, the individual will have to make the manual adjustment before transferring the telephone from one ear to the other ear during a conversation. Also, if the individual has a hearing impairment in both ears but one of the ears is less impaired, then the manual adjustment will have to be made based on which ear is used. In addition, other users of the telephone who do not have a hearing impairment will either have to readjust the telephone after the hearing impaired individual has used the telephone or use the configuration determined by the hearing impaired individual.

As a safety precaution, various governmental regulations require that a volume adjustment which increases the volume must be reset automatically at the end of a call in case a different individual uses the telephone for the next call. Illustratively, Paragraph 36 CFR Part 1194.23(g) in the Code of Federal Regulations states: "If a telecommunications product allows a user to adjust the receive volume, a function shall be provided to automatically reset the volume to the default level after every use." The problem with these regulations is that an individual with a hearing impairment who is constantly using a telephone has to constantly make the adjustment before each call.

SUMMARY OF THE INVENTION

A method and apparatus configure a handheld audio device to communicate audio information by identifying an ear being used with the handheld audio device and by configuring the handheld audio device in response to the ear identification to communicate audio information to the ear. The identification may use sonic or visual techniques to identify the ear.

DETAILED DESCRIPTION

An embodiment uses ear biometrics to identify an ear of an individual being utilized for the telephone conversation, and then utilizes a pre-existing description of that ear's sensory characteristics and deficiencies to adjust the acoustics and/or electromagnetic properties of the telephone to meet the hearing requirements of the ear. These requirements may be audio volume and/or spectral deficiencies. The embodiment may utilize visual or sonic techniques for the identification, or it may use a combination of these. The telephone may be a wired telephone or a wireless telephone such as a mobile telephone, cellular telephone; a cordless telephone, two-way radio, personal digital assistant (PDA), or any handheld audio device. In addition, the telephone is capable of using various media such as, but not limited, to video and audio. The wired telephone may be connected to the Public Switched Telephone Network (PSTN) or a private telephone exchange by a physical wire or may utilize a connection via a data switching network such as the Internet.

In another embodiment, if the ear biometrics operations failed to identify the ear, the telephone is set to a predefined configuration. This embodiment requires the training of the telephone to identify only one or two ears if only one individual is utilizing the telephone. For all other individuals using the telephone, the telephone would be set to a predefined configuration when the ear was not identified.

Figure 1:
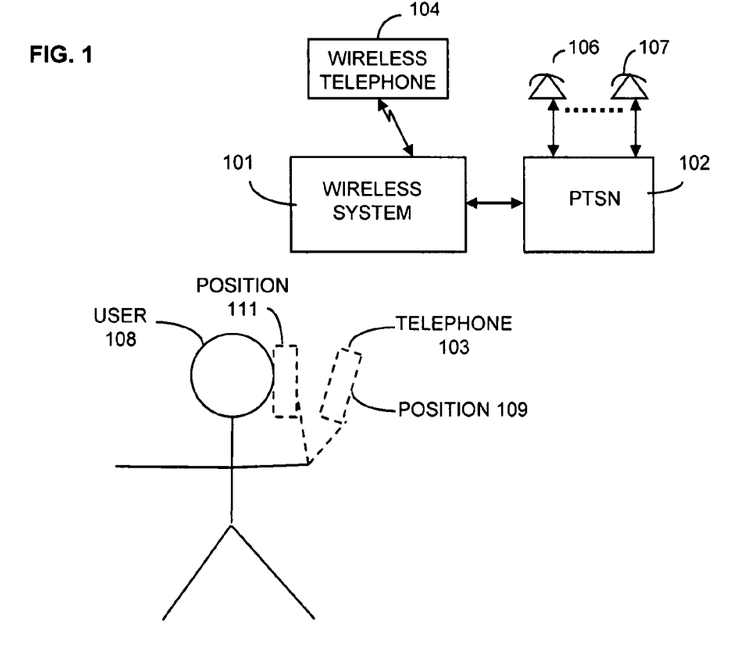
FIG. 1 illustrates an embodiment for identifying an ear of an individual.
Figure 2:
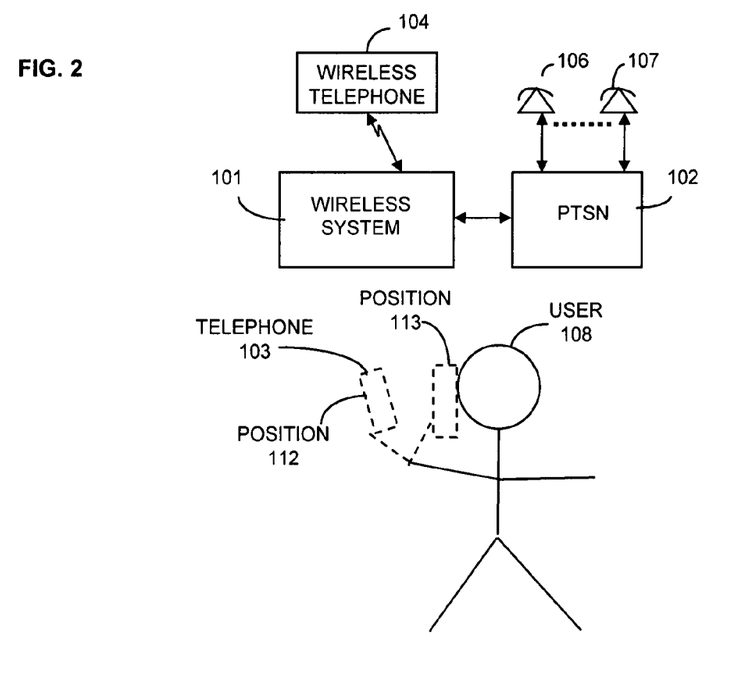
FIG. 2 illustrates an embodiment for identifying another ear of an individual.

FIGS. 1 and 2 illustrate the operations of adjusting the configuration of telephone 103. Telephone 103 may be connected to wireless system 101 or PSTN 102; hence, telephone 103 may be a wireless or a wired telephone. Note, one skilled in the art would immediately recognize that if telephone 103 is a wired telephone the portion of telephone 103 illustrated in FIGS. 1 and 2 may be only the handset portion of telephone 103. Also, the positions illustrated in FIGS. 1 and 2 are for illustration only, and one skilled in the art could readily devise other positions.

If the embodiment is utilizing visual techniques to identify an ear, upon an incoming call being received, telephone 103 utilizes its imaging capabilities to identify the ear as telephone 103 is moved from position 109 to position 111. To determine when telephone 103 has reached the ear, telephone 103 may utilize visual, heat, or acceleration techniques. Sonic techniques may also be used; for example, it may be assumed that the telephone 103 has reached the user's ear when the user is heard to speak into the mouthpiece. If the user of telephone 103 transfers the telephone from the ear illustrated in FIG. 1 to the ear illustrated in FIG. 2, telephone 103 can utilize its imaging capabilities to identify the second ear as telephone 103 is moved from position 112 to position 113.

If the embodiment is utilizing sonic technique to identify an ear (as opposed to using sonic techniques to initiate the identification process), upon an incoming call being received, telephone 103 waits until position 111 is achieved before utilizing the sonic technique to identify the ear. To determine when telephone 103 has reached the ear, telephone 103 may utilize sonic, visual, heat, or acceleration techniques. If the user of telephone 103 transfers the telephone from the ear illustrated in FIG. 1 to the ear illustrated in FIG. 2, telephone 103 will wait until position 113 is achieved before utilizing the sonic technique to identify the ear.

Figure 3:
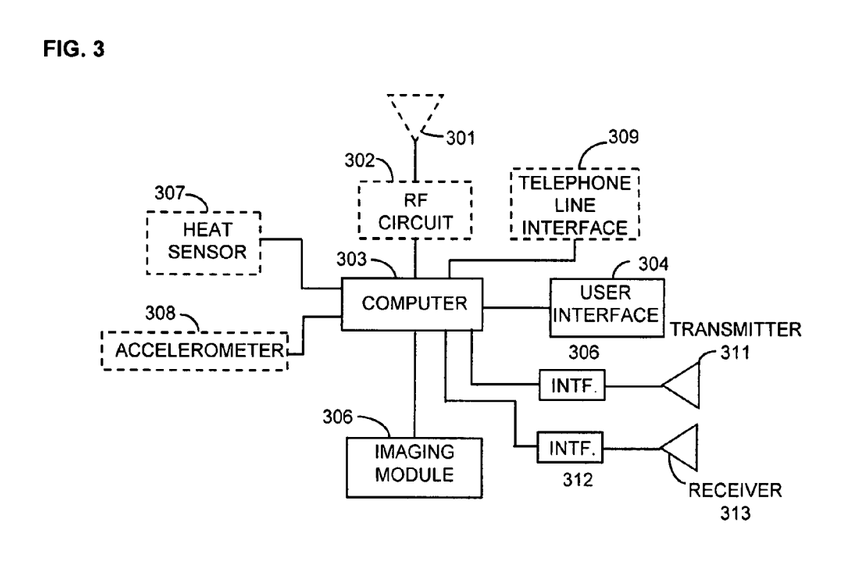
FIG. 3 illustrates, in block diagram form, an embodiment of a telephone that utilizes visual techniques for determining ear information.

FIG. 3 illustrates, in block diagram form, a telephone that utilizes visual techniques for determining ear information. Computer 303, which is shown in greater detail in FIG. 5, controls the operations of the telephone. If the telephone is a wireless telephone, it has blocks 301 and 302; but if the telephone is a wired telephone, it has block 309. If a wireless telephone, computer 303 controls RF circuit 302 for the transmission and reception of wireless signals both for audio information and control information. RF circuit 302 transmits and receives RF signals via antenna 301. If the telephone is a wired telephone, computer 303 controls telephone line interface 309. User interface 304 provides the functions of transmitting visual information to the user and receiving key and button actuation information from the user. User interface 304 is under control of computer 303. Imaging module 308 allows computer 303 to receive visual information. The telephone may have heat sensor 307 for detecting proximity to the ear using the heat from the ear. In addition, the telephone may have accelerometer 308 for determining when the telephone has reached the ear or is in motion.

Imaging module 308 includes but is not limited to lenses, lense(s) focusing mechanism, image capturing circuitry, and a light source for illuminating ears. Computer 303 processes the raw image information received from imaging module 308 into usable visual information and performs the analysis necessary to identify ears. By utilizing digital camera techniques well known to those skilled in the art, computer 303 can use imaging module 308 to determine movement and acceleration by examining a sequence of pictures.

Figure 10:
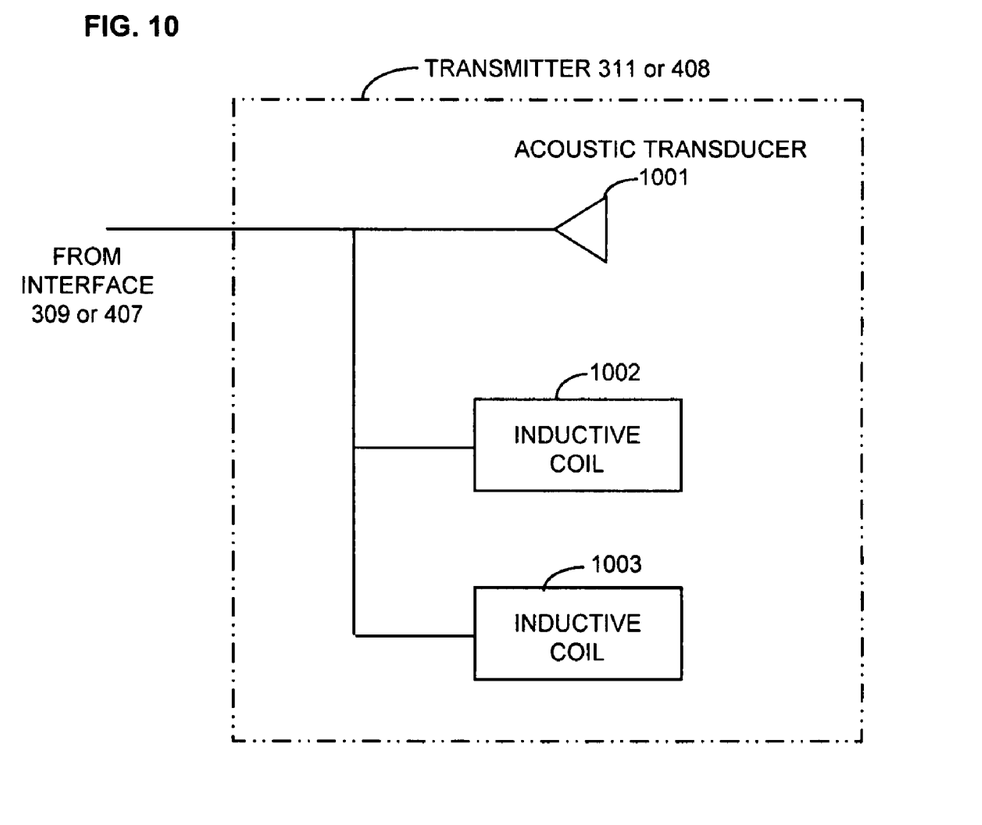
FIG. 10 illustrates an alternate embodiment of a transmitter having two inductive coils for the transmission of an electromagnetic field to a hearing aid.

Computer 303 receives audio information from the user via receiver 313 and interface 212. Computer 303 transmits audio information to the user via transmitter 311 and interface 309. As is illustrated in FIG. 10 and described in corresponding text, transmitter 311 may comprise an audio transducer and two primary inductive coils. The two primary inductive coils are used for users who have hearing aids that received the audio information as electro-magnetic fields rather than acoustic coupling. The term hearing aid is used within this application in a generic sense to include hearing aids that are positioned within the ear canal, cochlear implants, and other assistive listening devices as referred to in 36 CFR Part 1194.23(i). One primary inductive coil is used when the secondary inductive coil of the assistive listening device (commonly referred to as a "telecoil" or "T-coil") is in the ear canal. In this configuration, the primary inductive coil is on the same axes as the handset's speaker element. The other inductive coil is used to optimize the performance of assistive listening devices when the telecoil is located outside the canal, illustratively, the telecoil for a for a cochlear implant may be located in the mastoid bone behind the ear. The two primary inductive coils are positioned at different angles so as to maximize the electro-magnetic field to the hearing aid and optimize the polarity for the user's telecoil. When one of the inductive coils is utilized to communicate the audio information to the hearing aid, the volume of the sound produced by the audio transducer may be at normal volume or a reduced volume, provided that the electro-magnetic field strength and polarity are appropriate for the associated telecoil. Further, it will be apparent to anyone skilled in the art that a preferred implementation may require more than two primary inductive coils; illustratively, a primary inductive coil that is angled appropriated for a user's left-side cochlear implant would not provide optimal performance for that user's right-side implant.

In operation, computer 303 utilizes imaging module 306 in the following manner to identify to which ear of the user the telephone has been placed in proximity. When computer 303 detects that the telephone is in motion, computer 303 instructs imaging module 306 to take a sequence of pictures which are 2D images. Computer 303 will also monitor the amount of light available and enable the light source of imaging module 306 if necessary. Computer 303 also controls the focusing of the lenses of imaging module 306. Computer 303 then generates 3D images from the 2D images being gathered from imaging module 306.

Computer 303 then utilizes an ear identification database that contains ear identification information of the individuals who have trained the telephone to recognize their ears. Note, the database may only contain information for one or two ears if only one person is intended to use the telephone. If the ear is not identified, a predefined configuration is used for the telephone. Based on the information obtained from the database, computer 303 can identify which ear (left or right) and also may identify the individual whose ear it is. The operations of generating the 3D images from the 2D images and obtaining identification from a database with the 3D images is described in U.S. Pat. No. 7,065,232 and U.S. Patent Application No. 2006/0140453 both of which are hereby incorporated by reference. The databases set forth in the above incorporated patent and patent application are replaced by the ear identification database that is assembled by training the telephone for specified individuals. Alternatively, another embodiment may simply involve recognizing in a general sense whether the ear is a left or right ear. In this case, no database of individual ears is required.

Figure 4:
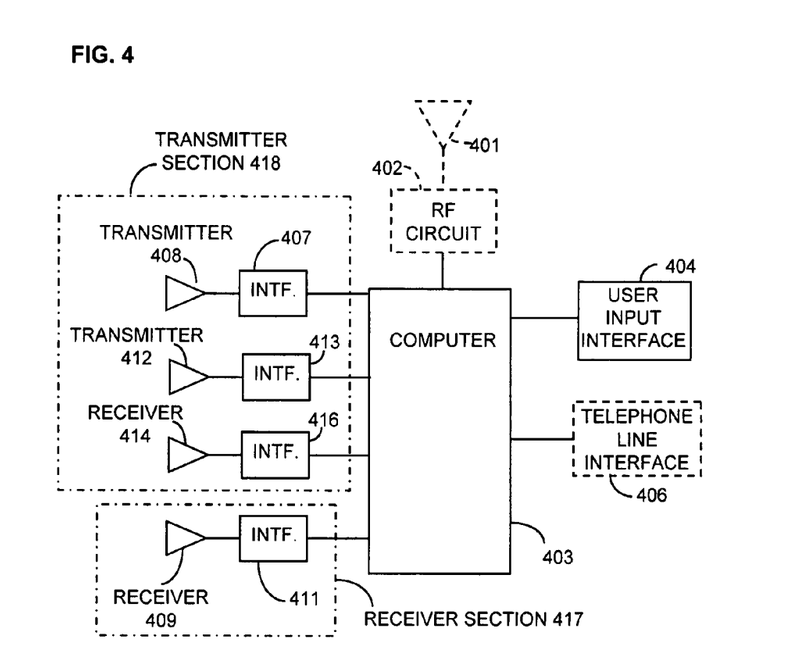
FIG. 4 illustrates, in block diagram form, an embodiment of a telephone that utilizes sonic techniques for determining ear information.

FIG. 4 illustrates, in block diagram form, a telephone that utilizes sonic techniques for determining ear information. If present, blocks 401 and 402 provide the same functions as described for blocks 301 and 302 of FIG. 3 but under control of computer 403 which is shown in greater detail in FIG. 9. If present, block 406 provides the same functions as described for block 309 of FIG. 3 but under control of computer 403. User input interface 404 provides the same functions as user interface 304 of FIG. 3.

Transmitter section 418 comprises the physical part of the telephone that the user associates with the transmitter of the telephone, and receiver section 417 comprises the physical part of the telephone that the user associates with the receiver of the telephone. Computer 403 uses transmitter 408 and interface 407 of transmitter section 408 to transmit voice information and other audible signals to the user. As discussed with respect to transmitter 311 of FIG. 3, transmitter section 418 may have both an audio transducer and two inductive coils as illustrated and described with respect to FIG. 10. However, computer 403 also utilizes transmitter 412 and interface 413 of transmitter section 418 to transmit ultrasonic frequencies to the ear of the user for the determination of resonant frequencies of the ear of the user. Computer 403 uses receiver 414 and interface 416 of transmitter section 418 to receive the information returned by the ear of the user in response to the ultrasonic frequencies so as to determine the resonant frequencies of the ear of the user. Computer 403 uses receiver 409 and interface 411 of receiver section 417 to receive voice information from the user.

When there is an active call on the telephone, computer 403 uses transmitter 412 and interface 413 to produce signals whose frequencies are in the ultrasonic range which may be within the range of 20 kHz to 60 kHz but is not limited to this particular range and one skilled in the art could readily envision utilizing a range of other frequencies. Such frequencies are not heard by people; hence, audio information at these frequencies will not interfere with telephone conversations. The ear canal of the user is responsive to these frequencies to resonate at different ones of the frequencies. Receiver 414 and interface 416 receive the echoes that are coming back from the ear, and computer 403 utilizes the echoes to determine the frequencies at which the ear canal is resonant or non-resonant (180° out of phase with a given frequency).

Computer 403 then utilizes an identification database to determine the ear (left or right) and may also identify the user using this resonance information. The database is established by all of the users who will utilize the telephone thereby training the telephone with respect to their ears. Note, the database may only contain information for one or two ears if only one person is intended to use the telephone. If the ear is not identified, a predefined configuration is used for the telephone. The resonance information also allows the telephone to detect when the telephone is moved near or away from a user's ear.

Figure 5:
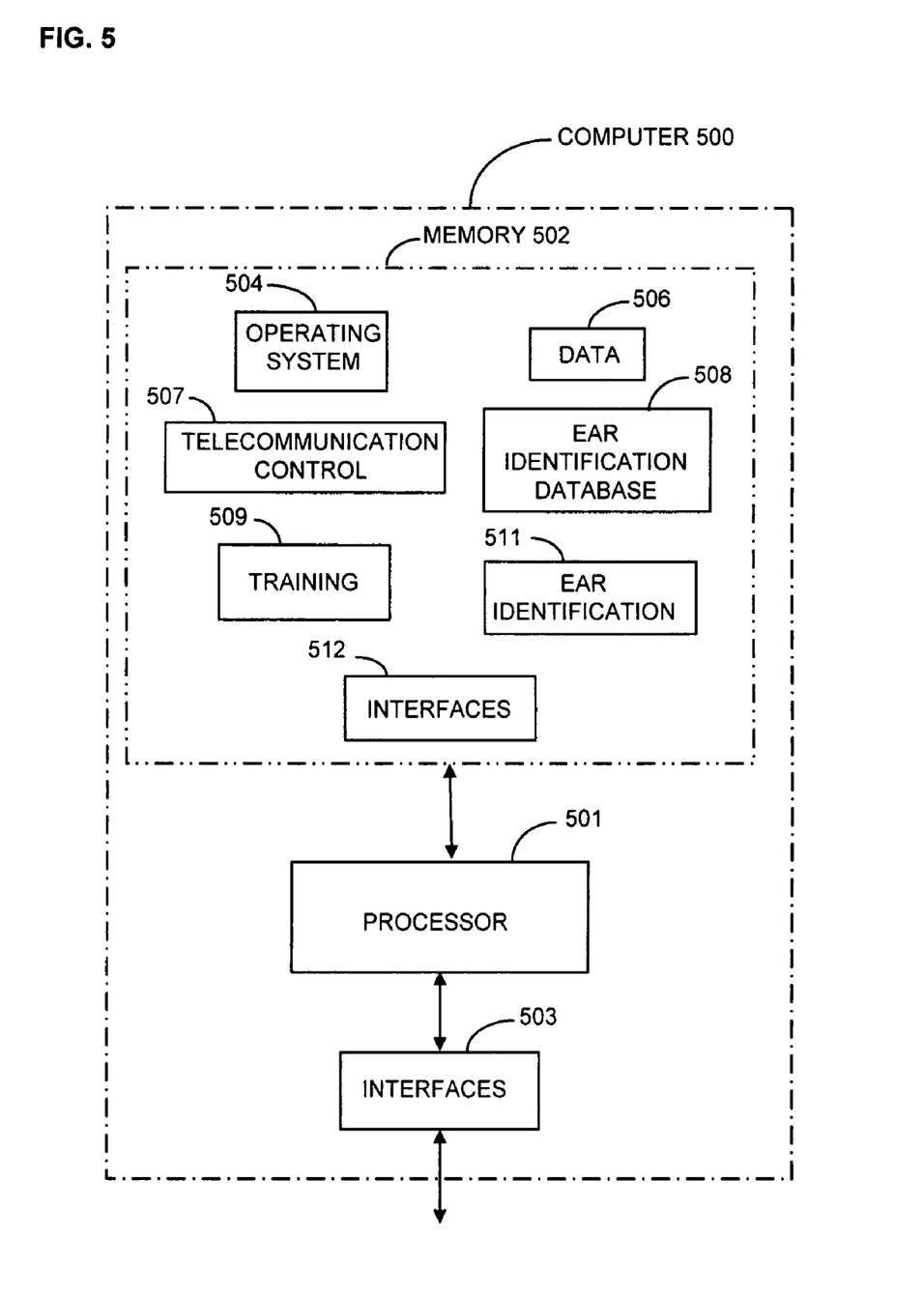
FIG. 5 illustrates, in block diagram form, a computer that may be utilized in FIGS. 3 and 4.

FIG. 5 illustrates, in block diagram form, computer 500 which may be computer 303 of FIG. 3 or computer 403 of FIG. 4. In FIG. 3, devices 302, 304, 306, 307 and 308 are connected to interfaces 503 in a manner well known to those skilled in the art. In FIG. 4, devices 402, 404, 406, 418, and 417 are connected to interfaces 503 also in a manner well known to those skilled in the art. Processor 501 controls these devices via interfaces 503 by executing routines stored in memory 502.

Interfaces routine 512 is executed by processor 501 to directly control the above noted devices via interfaces 503 based on decisions made by the other routines stored in memory 502.

Operating system 504 provides the overall control of computer 500 utilizing information stored in data 506.

Telecommunication control routine 507 controls the normal telecommunication operations of a telephone utilizing interfaces routine 512 and information stored in data 506.

Figure 8:
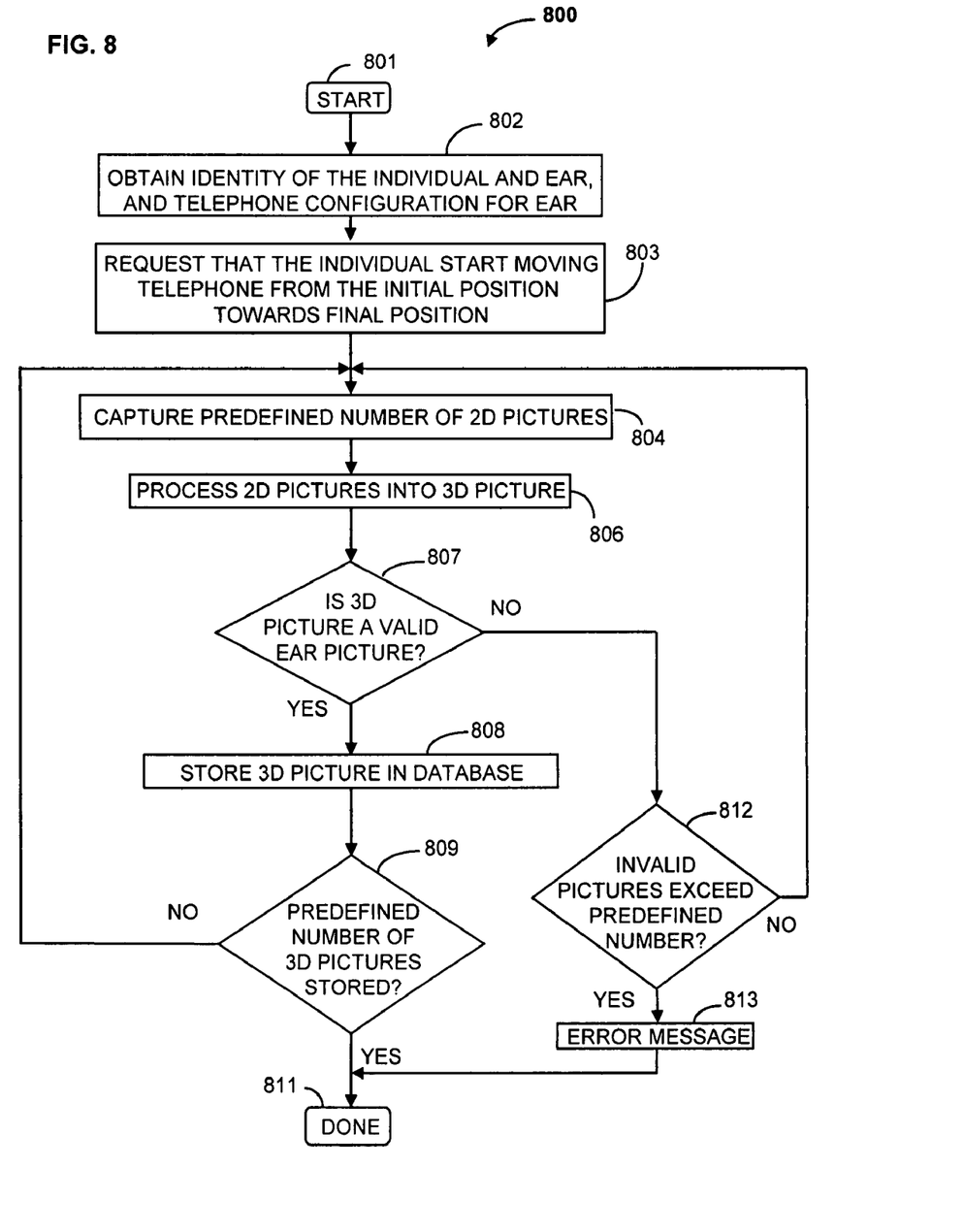
FIG. 8 illustrates, in flowchart form, operations 800 that are performed by an embodiment to train a telephone for utilization of the visual technique for ear identification.
Figure 9:
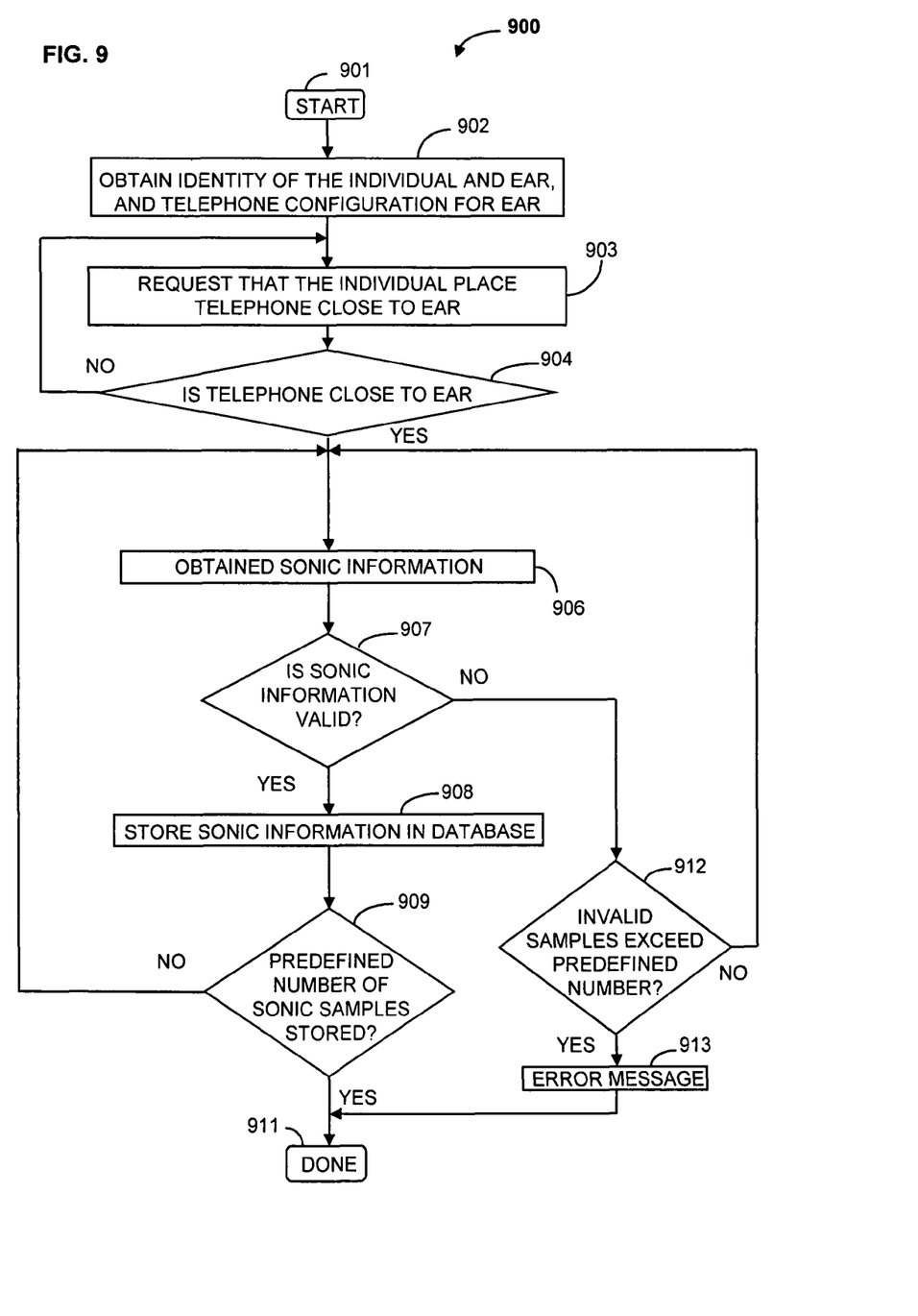
FIG. 9 illustrates, in flowchart form, operations 900 that are performed by an embodiment to train a telephone for utilization of the sonic techniques for ear identification.

The training operations as described in FIG. 8 or FIG. 9 are performed by training routine 509. Training routine 509 stores the identification of ears and individuals in ear identification database 508.

Figure 6:
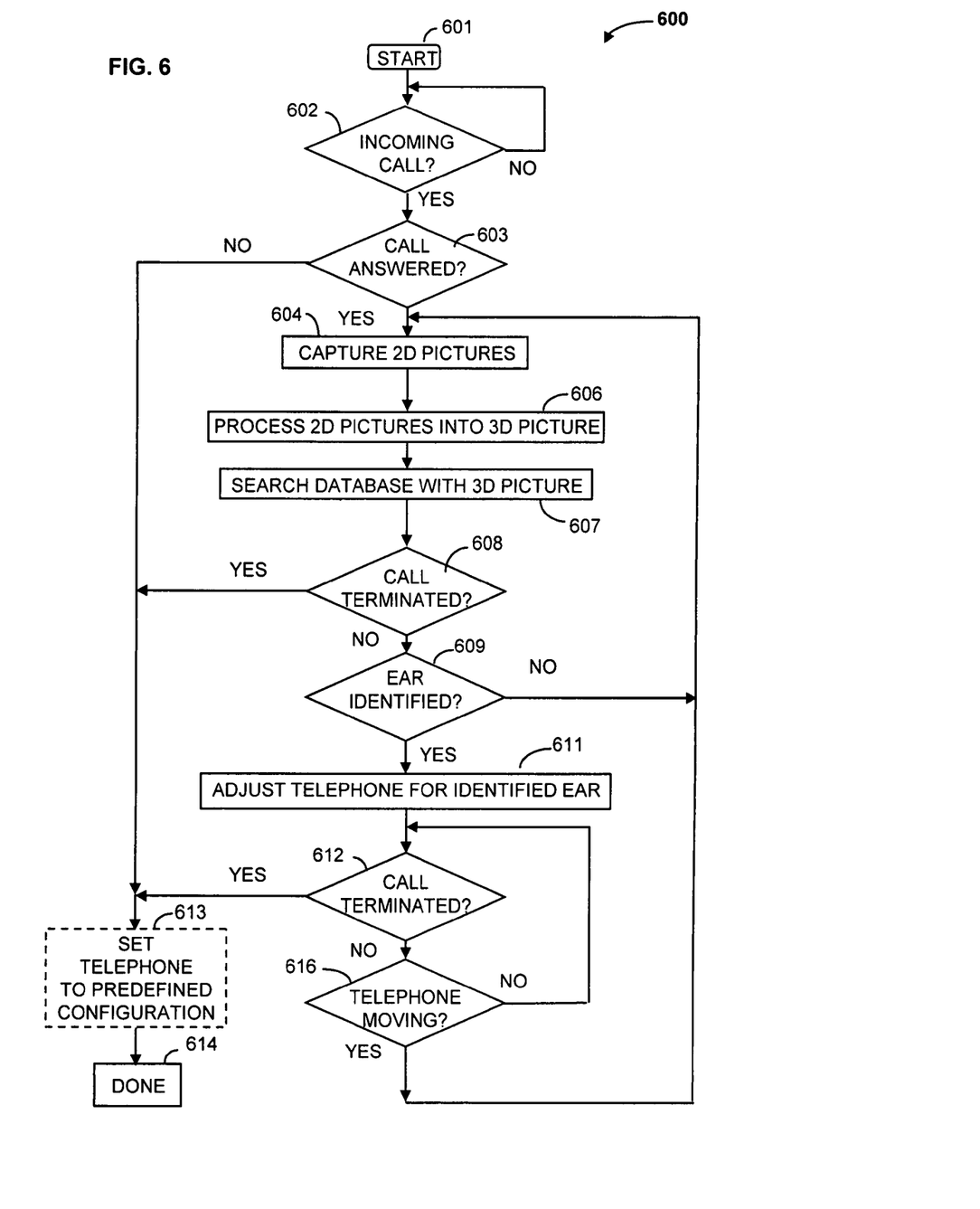
FIG. 6 illustrates, in flowchart form, operations 600 that are performed by the embodiment illustrated in FIG. 3 for utilizing visual techniques for determining ear information.
Figure 7:
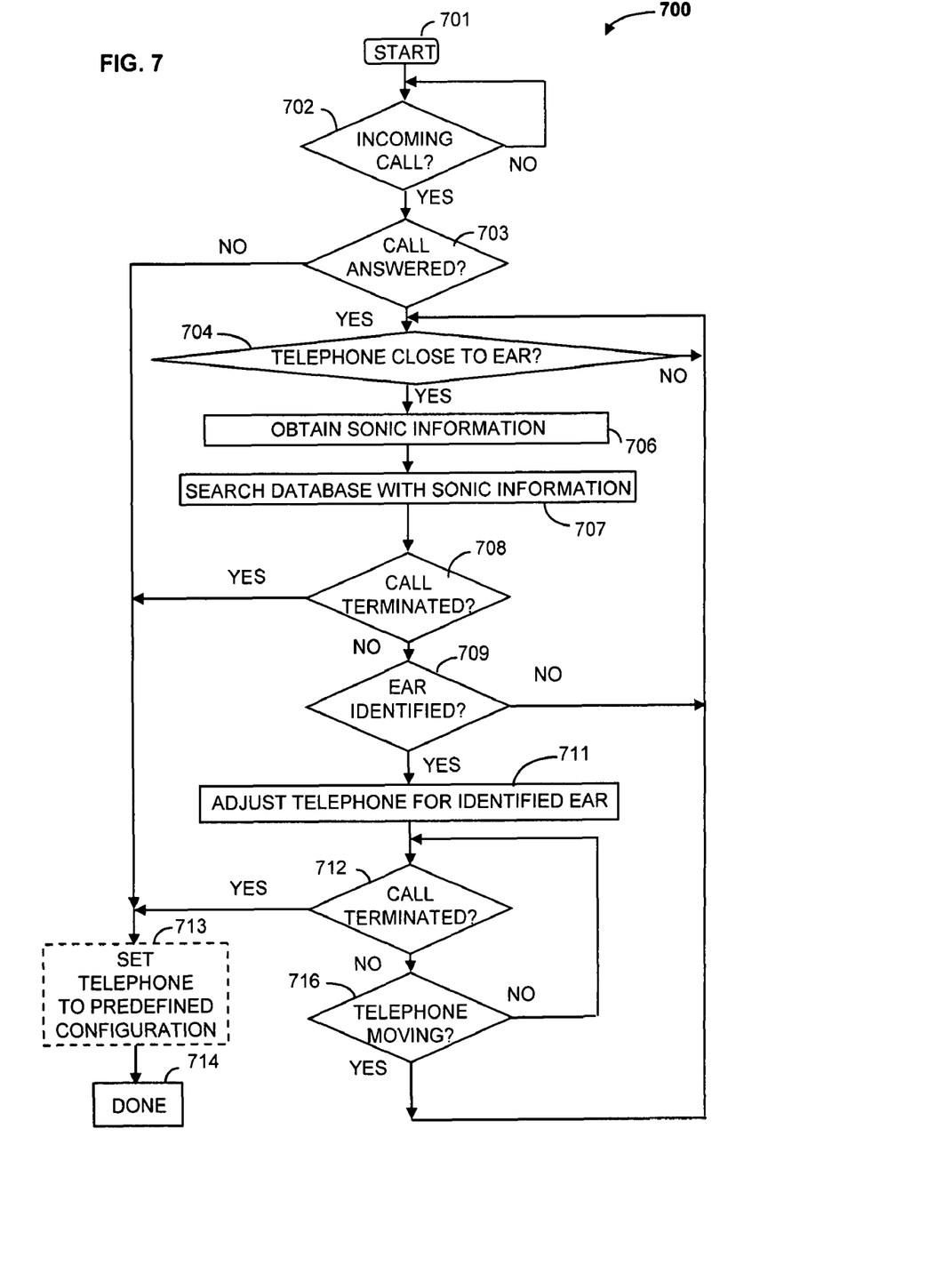
FIG. 7 illustrates, in flowchart form, operations 700 that are performed by the embodiment illustrated in FIG. 3 for utilizing sonic techniques for determining ear information.

Ear identification routine 511 performs the operations as described with respect to FIG. 6 or FIG. 7. Ear identification routine 511 utilizes the data stored in the ear identification database 508.

FIG. 6 illustrates, in flowchart form, operations 600 that are performed by the embodiment illustrated in FIG. 3 for utilizing visual techniques for determining ear information. After being started in block 601, decision block 602 determines if there is an incoming call. If the answer is no in decision block 602, decision block 602 is re-executed. If the answer is yes in decision block 602, decision block 603 determines if the call has been answered. If the answer is no, control is transferred to block 613 whose operations will be described later. If the answer is yes in decision block 603, control is transferred to block 604.

Block 604 captures 2D pictures utilizing imaging module 306 and computer 303 of FIG. 3. Then, block 606 processes the 2D pictures into a 3D picture. The resulting 3D picture is then used to search the database that contains the identification information of the ears of the users of the telephone. After execution of block 607, control is transferred to decision block 608. In the case of simply distinguishing between left and right ears, it may be sufficient to have a 2-D picture and not a 3-D picture.

Decision block 608 determines if the call has been terminated. If the answer is yes in decision block 608, control is transferred to block 613. If the answer in decision block 608 is no, control is transferred to decision block 609. The latter decision block determines if the search of the database in block 607 identified an ear. If the answer is no, control is transferred back to block 604. If the answer is yes in decision block 609, block 611 adjusts the telephone for the identified ear using the telephone configuration stored for that ear before transferring control to decision block 612. Block 611 determines whether to adjust the acoustic sound level and/or to utilize one of the inductive coils that transmit electromagnetic waves to a hearing aid.

Decision block 612 determines if the call has been terminated. If the answer is yes, control may be transferred to block 613 if it is present. If block 613 is not present, control is transferred to block 614. Block 613 is only present if it is desired that the telephone always be reset to a predefined configuration. If present, block 613 sets the telephone to a predefined configuration before transferring control to block 614 which terminates the operations.

Returning to decision block 612, if the answer in decision block 612 is no, decision block 616 determines if the telephone is in motion. This detection may be performed utilizing visual, heat, or acceleration techniques. If the answer is no in decision block 616, control is transferred back to decision block 612. If the answer is yes in decision block 616, control is transferred back to block 604.

FIG. 7 illustrates, in flowchart form, operations 700 that are performed by the embodiment illustrated in FIG. 3 for utilizing sonic techniques for determining ear information. After being started in block 701, decision block 702 determines if there is an incoming call. If the answer is no in decision block 702, decision block 702 is re-executed. If the answer is yes in decision block 702, decision block 703 determines if the call has been answered. If the answer is no, control is transferred to block 713 whose operations will be described later. If the answer is yes in decision block 703, control is transferred to decision block 704.

Decision block 704 determines when the telephone is at the ear. This can be done using sonic, heat, or acceleration techniques. Then, block 706 performs the sonic analysis of the ear utilizing transmitter section 418 and computer 403 of FIG. 4. The resulting sonic information is then used to search the ear identification database that contains the identification information of the ears of the users of the telephone. After execution of block 707, control is transferred to decision block 708.

Decision block 708 determines if the call has been terminated. If the answer is yes in decision block 708, control is transferred to block 713. If the answer in decision block 708 is no, control is transferred to decision block 709. The latter decision block determines if the search of the database in block 707 identified an ear. If the answer is no, control is transferred back to block 704. If the answer is yes in decision block 709, block 711 adjusts the telephone for the identified ear using the telephone configuration stored for that ear before transferring control to decision block 712. Block 711 determines whether to adjust the acoustic sound level and/or to utilize one of the inductive coils that transmit electromagnetic waves to a hearing aid.

Decision block 712 determines if the call has been terminated. If the answer is yes, control may be transferred to block 713 if it is present. If block 713 is not present, control is transferred to block 714. Block 713 is only present if it is desired that the telephone always be reset to a predefined configuration. If present, block 713 sets the telephone to a predefined configuration before transferring control to block 714 which terminates the operations.

Returning to decision block 712, if the answer in decision block 712 is no, decision block 716 determines if the telephone is in motion. This detection may be performed utilizing sonic, heat, or acceleration techniques. If the answer is no in decision block 716, control is transferred back to decision block 712. If the answer is yes in decision block 716, control is transferred back to block 704.

FIG. 8 illustrates, in flowchart form, operations 800 that are performed by an embodiment to train a telephone for utilization of the visual technique for ear identification. After being started in block 801, block 802 obtains the identity of the individual and which ear is being tested. Note, there may be only one individual that is tested. In addition, block 802 obtains the telephone configuration that is to be used with this ear. Computer 303 can use user interface 304 to obtain this information. Then, block 803 requests that the individual start moving the telephone from the initial position towards the final position which is when the telephone is against the ear.

As the movement starts, blocks 804-809 attempt to store a predefined number of 3D pictures in the database for future use in identifying the ear and the individual. First, block 804 captures a predefined number of 2D pictures, and block 806 processes these 2D pictures into a 3D picture before transferring control to decision block 807.

Decision block 807 determines if the 3D picture is a valid ear picture since the telephone may be miss-pointed. If the answer is yes in decision block 807, block 808 stores the 3D picture in the ear identification database before transferring control to decision block 809.

Decision block 809 determines if a predefined number of 3D pictures have already been stored in the database. If the answer is no, control is transferred back to block 804. If the answer in decision block 809 is yes, control is transferred to block 811 and the process is complete.

Returning to decision block 807, if the answer in decision block 807 is no, decision block 812 determines if the invalid number of pictures that have been taken by the telephone exceeds a predefined number. If the answer is no, control is transferred back to block 804. If the answer in decision block 812 is yes, control is transferred to block 813 which signals an error before transferring control to block 811.

FIG. 9 illustrates, in flowchart form, operations 900 that are performed by an embodiment to train a telephone for utilization of the sonic technique for ear identification. After being started in block 901, block 902 obtains the identity of the individual and which ear is being tested. Note, there may be only one individual that is tested. In addition, block 902 obtains the telephone configuration that is to be used with this ear. Computer 403 can use user interface 404 of FIG. 4 to obtain this information. Then, block 903 requests that the individual place the telephone close to the ear.

Next, decision block 904 determines if the telephone is indeed close to the ear. If the answer is no in decision block 904, control is transferred back to block 903. If the answer is yes in decision block 904, control is transferred to block 906. The latter block obtains the sonic information by computer 403 utilizing transmitters section 418 before transferring control to decision block 907.

Decision block 907 determines if the sonic information obtained by block 906 is valid. If the answer is yes in decision block 907, block 908 stores the sonic information in the database before transferring control to decision block 909.

Decision block 909 determines if predefined samples of sonic information have already been stored in the database. If the answer is no, control is transferred back to block 906. If the answer in decision block 909 is yes, control is transferred to block 911 and the process is complete.

Returning to decision block 907, if the answer in decision block 907 is no, decision block 912 determines if the invalid number of samples of sonic information that have been taken by the telephone exceeds a predefined number. If the answer is no, control is transferred back to block 906. If the answer in decision block 912 is yes, control is transferred to block 913 which signals and error before transferring control to block 911.

FIG. 10 illustrates an alternate embodiment of transmitter 311 or 408. In this embodiment, the controlling interface (309 or 407) may utilize only acoustic transducer 1001 and/or may utilize inductive coil 1002 or 1003 for communicating audio information to a user. Inductive coils 1002 and 1003 are utilized with hearing aids that receive the audio information as electro-magnetic fields rather than as acoustic information. Inductive coil 1002 is positioned so as to communicate the maximum electro-magnetic field to a hearing aid located within the ear canal. Inductive coil 1003 is angled so as to communicate the maximum electro magnetic field to a hearing aid that utilizes a cochlear implant located in the mastoid bone located behind the ear.

When the operations of a computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where the computer is implemented in hardware, the telephone set, control computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for configuring a handheld audio device to communicate audio information, comprising:
    initially obtaining sets of visual or sonic parameters with each set defining a ear of a user;
    initially storing the obtained visual or sonic parameters in a database for the user;
    detecting use of the handheld audio device by the user;
    testing the ear of the user being used with the handheld audio device for visual or sonic parameters in response to the detected ear;
    determining which ear of the user is the ear being used with the handheld audio device by comparing the visual or sonic parameters obtained by the testing of the steps of visual or sonic parameters stored in the database for the user to identify the ear of the user being used with the handheld audio device; and
    configuring the handheld audio device in response to the ear identification to communicate audio information to the identified ear of the user.

2. The method of claim 1 wherein the configuring comprises adjusting a volume of the acoustic signal representing the audio information.

3. The method of claim 1 wherein the configuring comprises adjusting a spectral content of the audio information.

4. The method of claim 1 wherein the configuring comprises adjusting an electro-magnetic field communicating the audio information.

5. The method of claim 4 wherein the adjusting comprises controlling strength of the electro-magnetic field communicating the audio information.

6. The method of claim 4 wherein the adjusting comprises aiming the electro-magnetic field.

7. The method of claim 6 wherein the aiming comprises selecting one of a plurality of inductive coils to produce the electro-magnetic field.

8. The method of claim 1 wherein the handheld audio device is at least one of a mobile telephone, a cellular telephone, a cordless telephone, a two-way radio, or a personal digital assistant.

9. A non-transitory computer-readable medium for configuring a handheld audio device to communicate audio information, comprising computer executable instructions configured for:
    initially obtaining sets of visual or sonic parameters with each set defining a ear of a user;
    initially storing the obtained visual or sonic parameters in a database for the user;
    detecting use of the handheld audio device by the user;
    testing the ear of the user being used with the handheld audio device for visual or is sonic parameters in response to the detected ear;
    determining which ear of the user is the ear being used with the handheld audio device by comparing the visual or sonic parameters obtained by the testing of the steps of visual or sonic parameters stored in the database for the user to identify the ear of the user being used with the handheld audio device; and
    configuring the handheld audio device in response to the ear identification to communicate audio information to the identified ear of the user.

10. The non-transitory computer-readable medium of claim 9 wherein the configuring comprise adjusting a volume of the acoustic signal representing the audio information.

11. The non-transitory computer-readable medium of claim 9 wherein the configuring comprise adjusting a spectral content of the audio information.

12. The non-transitory computer-readable medium of claim 9 wherein the configuring comprise adjusting an electro-magnetic field communicating the audio 5 information.

13. The non-transitory computer-readable medium of claim 12 wherein the adjusting comprise controlling strength of the electro-magnetic field communicating the audio information.

14. The non-transitory computer-readable medium of claim 12 wherein the adjusting comprise aiming the electro-magnetic field.

15. The non-transitory computer-readable medium of claim 14 wherein the aiming comprise for selecting one of a plurality of inductive coils to produce the electro-magnetic field.

16. The non-transitory computer-readable medium of claim 9 wherein the handheld audio device is at least one of a mobile telephone, a cellular telephone, a cordless telephone, a two-way radio, or a personal digital assistant.

* * * * *